(12) United States Patent
Cai

(10) Patent No.: US 6,583,648 B1
(45) Date of Patent: Jun. 24, 2003

(54) METHOD AND APPARATUS FOR FINE GRANULARITY CLOCK GATING

(75) Inventor: Zhong-Ning (George) Cai, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/100,050

(22) Filed: Mar. 19, 2002

(51) Int. Cl.[7] .................................................. H03K 3/00
(52) U.S. Cl. .............................. 326/93; 326/95; 326/98; 327/293; 327/295
(58) Field of Search ............................. 326/93, 95, 98; 327/393, 395, 397

(56) References Cited

U.S. PATENT DOCUMENTS

| 6,020,774 A | * | 2/2000 | Chiu et al. ................... 327/295 |
| 6,313,683 B1 | * | 11/2001 | Block et al. .................. 327/295 |
| 6,452,435 B1 | * | 9/2002 | Skergan et al. ............. 327/293 |

* cited by examiner

Primary Examiner—Michael Tokar
Assistant Examiner—Vibol Tan
(74) Attorney, Agent, or Firm—Kenyon & Kenyon

(57) ABSTRACT

A method and apparatus provide power control for a multiple giga-hertz frequency integrated circuit. The method and apparatus include multiple levels of clock gating control circuitry and a clock distribution network to generate a low-skew system clock signal, and generate a gated clock signal, from the system clock signal, and distribute the gated clock signal to a plurality of local logic circuits in the integrated circuit.

23 Claims, 6 Drawing Sheets

METHOD AND APPARATUS FOR FINE GRANULARITY CLOCK GATING

BACKGROUND OF THE INVENTION

1. Field of the Invention

The present invention relates generally to clock distribution systems in integrated circuits. It particularly relates to a clock distribution system using clock gating to control power.

2. Background

In modern integrated circuits, such as computer processors, it is common to use clock gating as a power control technique. A driving clock signal energizes components of a circuit. Data signals determine the circuit's response and may generate still other data for use by other circuits. When a circuit is not used, however, it is common to disable the clock signal by stopping the clock signal entirely or substantially reducing its clock activity (frequency) as it is input to the circuit. Consequently, the circuit components are substantially de-energized and power consumption is reduced. "Clock gating" refers generally to techniques to manage the enabling and disabling of clock signals to individual components to conserve power.

Clock gating circuits typically are integrated as part of a clock distribution network. Often, the distribution network is organized according to a tree structure such as the clock distribution network 100 shown in FIG. 1. A clock signal 101, generated by clock generator 102, propagates from a root level 106 (level 1) of the network 100 (tree) including a plurality of branches (106-1 to 106-N) to one or more lower branch levels 108 (level 2) including a further plurality of branches (108-1 to 108-N). Clock gating logic circuits 104 are provided along the branches where each gating circuit 104 receives a local clock gating condition (enabling/disabling) signal 110 and the propagating clock signal as inputs. Each gating logic circuit 104, located along a branch, may block (disable or slow) a regular clock signal from propagating further along the respective branch if the local clock gating conditions trigger clock gating.

When the branches themselves branch when going from root level 106 (level 1) to lower branch level 108 (level 2), gating logic circuits 104 are provided again on each further branch (sub-branch), again to block (or slow) propagation of the clock signal. This technique may be repeated for as many branches as are present in the clock distribution network until the clock is input to a local circuit 112. The clock signal may traverse multiple gating circuits as it propagates from the root node to a terminal branch of the tree. However, as shown in this technique, the enabling signal for the local clock gating condition 110 must be redundantly input at each branch level, and clock gating triggered at an upper branch level (e.g., 106—level 1) will disable (or slow) the clock signal at all lower branch-levels (e.g., 108—level 2).

Furthermore, now that clock frequencies (especially in high-performance processor systems) are meeting and exceeding the multiple GHz (giga-hertz) frequency level, disadvantages with conventional clock gating schemes are becoming apparent. Ideally, rising and falling edges of a driving clock signal should arrive at each local circuit at exactly the same time. An optimal clock distribution scheme should eliminate clock skew effect associated with the clock signal arrival at the local circuits. Skew may be caused by a plurality of factors including, but not limited to, uneven clock load (glitches) in the clock distribution network, a high number of circuits in the clock distribution network, wiring distance, repeater usage, or other factors. Also, the varying number of gating circuits that are traversed from the root node to each of the local circuits may add skew and other spurious effects. Furthermore, clock frequencies operating at the multiple GHz range provide a very short setup time (for clock gating) due to the limited (reduced) duty cycle of a very fast clock. Accordingly, a new clock distribution scheme is needed to reduce (or eliminate) clock glitch and to provide a minimum physical distance between the clock gating control circuitry and the local circuit to be clock-gated.

DETAILED DESCRIPTION

Embodiments of the present invention provide a gating scheme in a clock distribution network that permit clock signals to propagate from a clock source (generator) to a logic circuit where the clock signals may traverse a single (low-level) clock gating circuit for immediate delivery (over a short distance) to the logic circuit. By doing so, problems regarding clock skew, short clock gating setup time, and other clock distribution anomalies that may arise at higher clock frequencies (such as 2 GHz and greater) are reduced. Such embodiments may be achieved by developing a clock gating distribution network that processes enabling/disabling signals representing global-, regional- and local-level clock gating conditions, as well as interface clock gating conditions, and delivers individually addressed gating control signals to local logic circuits. A low-level clock gating control circuit may be provided at a clocking input to each local circuit. The gating control signal may cause the clock signal to propagate into the local logic circuit at a regular frequency, at a substantially reduced frequency, or be completely disabled (blocked).

Figure 1:
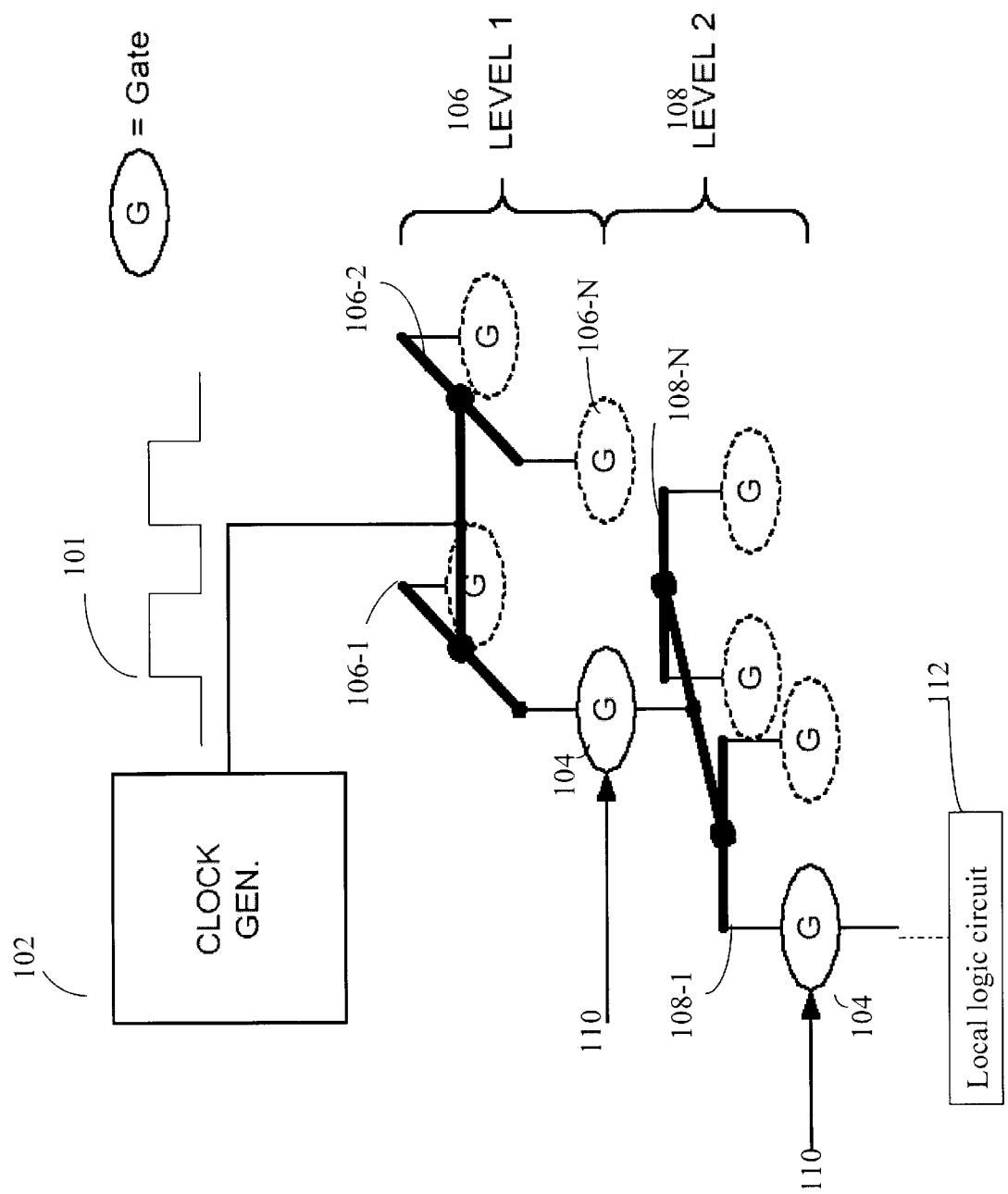
FIG. 1 illustrates a prior art clock distribution network.
Figure 2:
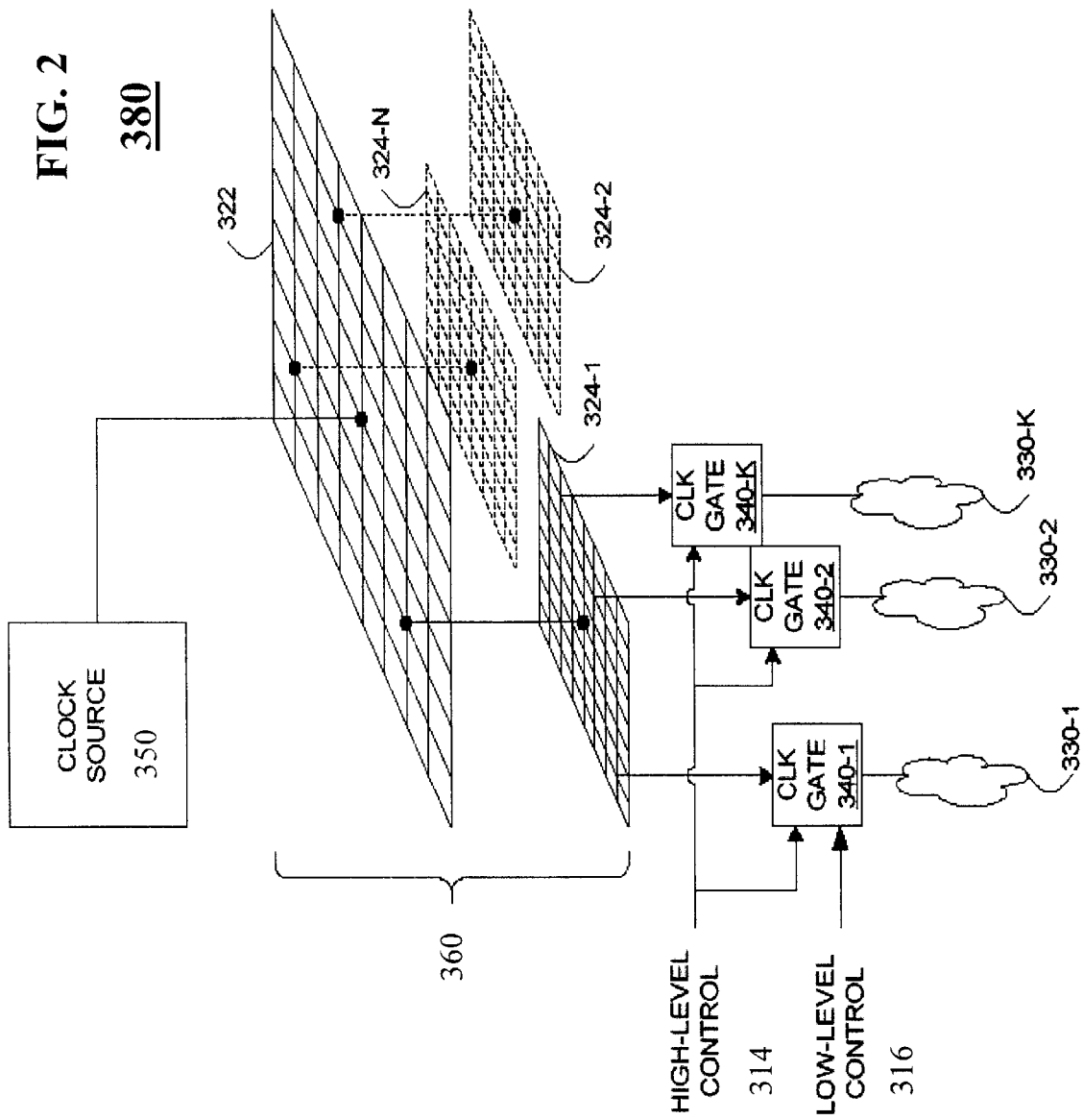
FIG. 2 illustrates an exemplary clock distribution circuit in accordance with embodiments of the present invention.

FIG. 2 illustrates an exemplary clock distribution circuit 380 according to an embodiment of the present invention. The circuit may provide a clock distribution network 360 interconnecting a clock source with a plurality of local logic circuits (blocks) 330-1 to 330-K. As illustrated in FIG. 2, the clock distribution network 360 may be provided as a matrix network populated by a course distribution layer 322 and one or more fine distribution layers 324-1 to 324N to distribute clock signals to local logic circuits 330-1 to 330-K. The course distribution layer 322 provides electrical propagation paths through an integrated circuit with a coarse spacing between them and the fine distribution layers 324-1 to 324-N to provide propagation paths through the circuit with a fine spacing between them. In one embodiment the clock distribution network 360 may be confined to a network within an integrated circuit but, in others, the clock network 360 may extend across multiple integrated circuits.

Ideally, circuit paths between a clock source and each of the local circuits have an identical length regardless of the location of the local circuits on the integrated circuits. Advantageously, this configuration minimizes clock skew.

In an embodiment, a low-level clock gating control circuit 340-1 to 340-K may be provided for each of the local logic circuits 330-1 to 330-K in an integrated circuit (e.g., a processor system), coupling each local logic circuit 330-1 to 330-K to the clock distribution network. Operation of the clock gating control circuit 340-1 to 340-K may be controlled by a number of different factors, as described herein, including global gating, regional gating, and interface-gating conditions, as provided by high-level control signals 314, and/or local gating conditions, as provided by local control signals 316, that are both input to each clock gating control circuit 340-1 to 340-K. The generation of these enabling/disabling signals in response to the different gating conditions is well-understood in the field of invention.

Figure 3:
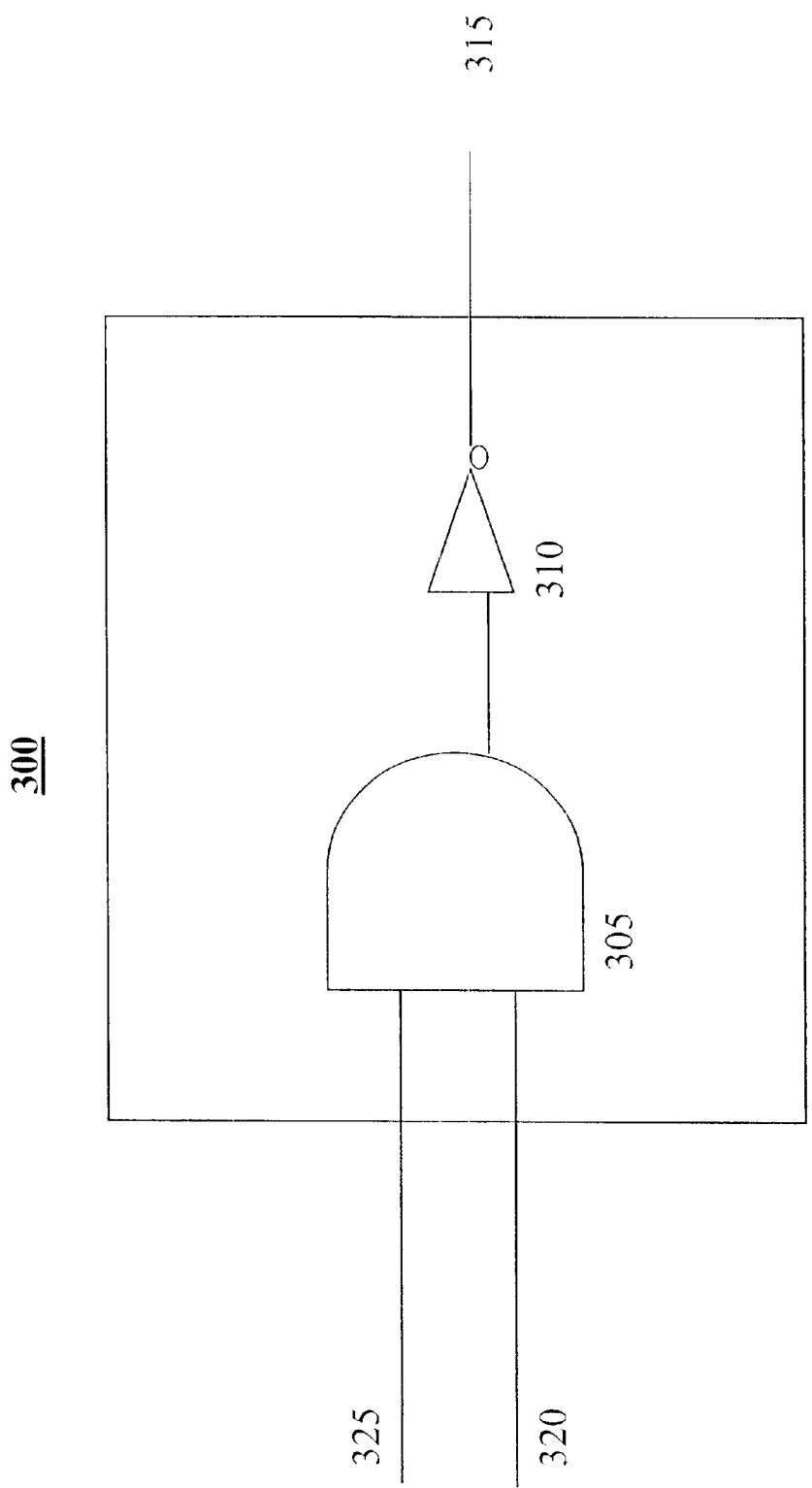
FIG. 3 illustrates an exemplary local clock gating control circuit in accordance with embodiments of the present invention.

In accordance with embodiments of the present invention, FIG. 3 illustrates an exemplary local clock gating control (logic) circuit that may be simply provided as a logic gate such as AND, NAND, OR or NOR gate that has a clock signal as a first input and a control (enabling) signal as a second input. An output of the gate may be used as a clock source (gated clock output signal) to the local circuit. For this exemplary embodiment, local clock gating circuit 300 may be included within each clock gating control circuit 340-1 to 340-K shown in FIG. 2. Local gating circuit 300 may include logic circuits 305, 310 (e.g., representing AND, inverter logic circuits) that perform necessary logic functions to generate a gated clock output signal 315, a clock signal whose regular frequency (e.g., 2 GHz) has been substantially lowered to reduce power consumption in the local logic circuit 330-1 to 330-K. Gated clock output signal 315 is generated from input signals 325, 320 where input signal 320 may be a local clock enabling signal generated from previous logic circuitry (within gating control circuit 230-1), and input signal 325 may be a regional clock signal (e.g., a delayed version from the global clock signal) generated from clock source 310.

Figure 4:
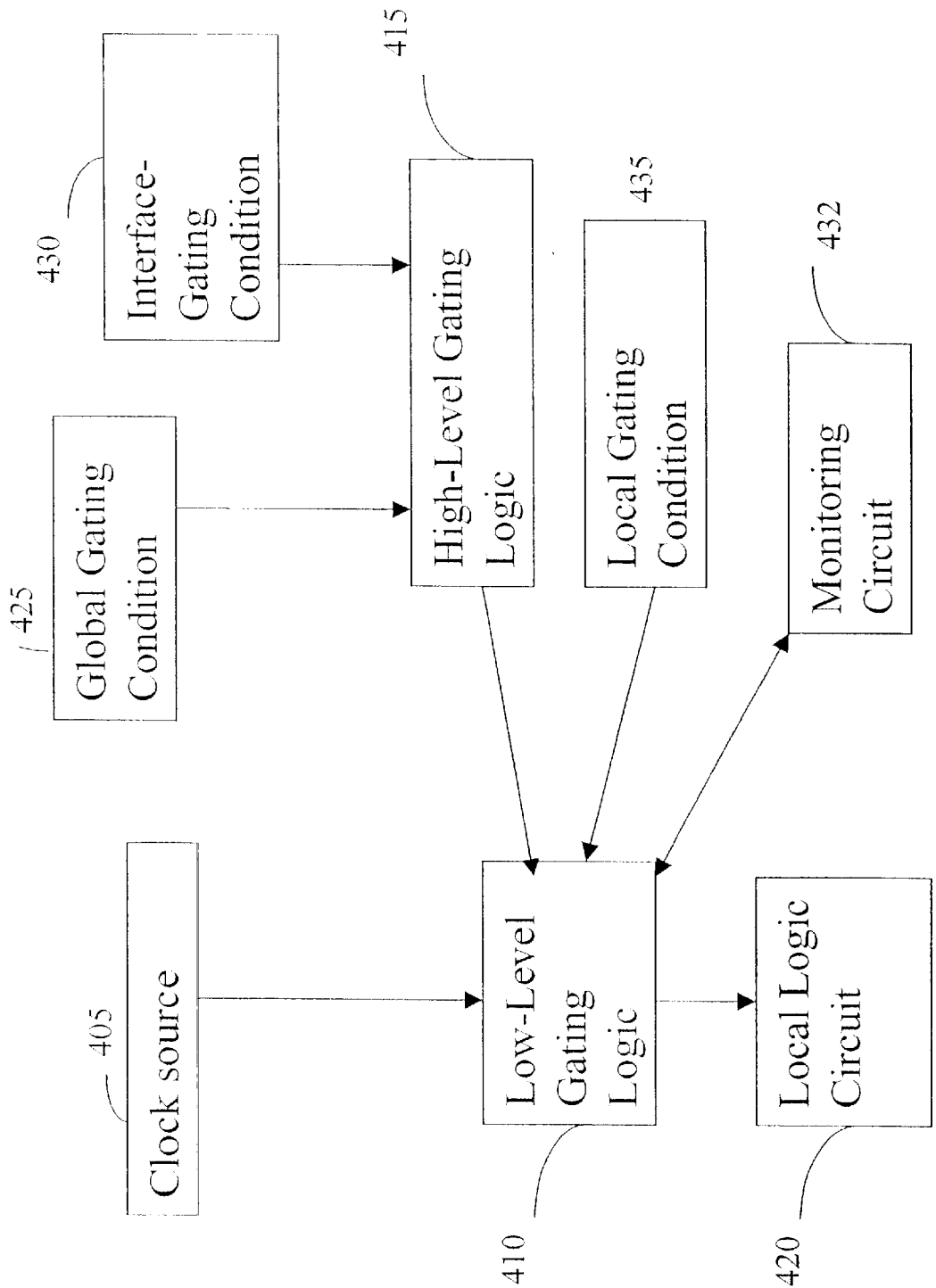
FIG. 4 illustrates the interaction of multiple levels of clock gating control logic in accordance with embodiments of the present invention.

In accordance with embodiments of the present invention, FIG. 4 illustrates the interaction of multiple levels of clock gating control logic. A clock generator (source) 405 provides a clock signal to a low-level clock gating control (logic) circuit 410 to generate a gated clock output signal for a local logic circuit 420 when local clock gating is enabled.

In addition to the clock signal, low-level clock gating control circuit 410 receives input enabling/disabling signals from high-level clock gating logic 415 and local clock gating conditions 435. Local clock gating condition 435 provides enabling/disabling signals for clock gating conditions that arise for local logic circuits (e.g., disable clock for currently unused local logic circuit). High-level clock gating logic 415 generates the input enabling/disabling signal (e.g., a regional clock gating enabling signal) by receiving input signals from global clock gating condition 425 and interface clock gating condition 430. Global clock gating condition 425 provides enabling/disabling signals for clock gating conditions that arise at the global level (e.g., power reset) for the integrated circuit (e.g., processor system). Interface-gating condition 430 may provide an exception control mechanism to maintain a local logic circuit in an enabled state (receiving a regular clock signal) when another control signal (e.g., global control signal) would otherwise disable the local logic circuit. Furthermore, interface-gating condition 430 provides control signals for clock gating conditions that arise as a result of local logic circuit 420 interacting with other local logic circuits within the integrated circuit (e.g., processor system). These interactions may cause failures (bugs) when a first local logic circuit is clock-gated (disabled) while a second, active, and interfacing local logic circuit relies upon the first logic circuit for critical data signals. Furthermore, the interface-gating condition may prevent the potential disabling of a massive number of local logic circuits due to local clock gating condition and local logic circuitry interaction (timing) failure. Monitoring logic circuits may be used to determine that local, global, or interface clock gating conditions have been met as well-understood in the field of invention. Also, as described herein, a monitoring logic circuit 432 may be added to the gating control logic to measure the current change (di/dt) caused by clock gating.

The monitoring logic circuit may include combinational logic circuits (e.g., XOR, AND, NOR, etc.) that accept gating condition input signals to determine whether clock gating should be enabled. In an exemplary embodiment, the monitoring circuit may accept three inputs signals (A, B, C) and may comprise an XOR gate followed by an AND gate to output a signal that satisfies the boolean expression (A⊕B)×C. Therefore, if C=1 (has a logic level of "1") where A and B have opposing values (A=1 and B=0, or A=0 and B=1), then the circuit will output a "1" and enable clock gating for the next clock cycle. Advantageously, the monitoring logic circuit receives time-critical input signals with the rising edge of the clock cycle to predict clock gating for the next clock cycle. For this example, input signals A and B may be considered time-critical since their XOR output critically determines enabling of clock gating in advance of input signal C becoming available. This XOR computation will be performed regardless of the value of input signal C. Therefore, when input signal C becomes available, the Boolean equation of AND logic (represented by the logical operator "x") can be executed very rapidly to ensure that timing requirements for clock gating setup are met. Dependent on the particular integrated circuit design (e.g., a floating point pipeline processor), it may be known which input signals to the monitoring circuit will be early arriving.

It is noted that FIG. 4 is solely an exemplary embodiment that illustrates the interaction of multiple clock gating levels and a clock distribution network to generate a clock signal for a single local logic circuit. However, embodiments of the present invention are not limited to a single local logic circuit, and advantageously the multiple levels of gating logic form part of a system-wide multiple level gating logic network that interfaces with one or more clock sources to generate clock signals to a plurality of local logic circuits within an integrated circuit.

Figure 5:
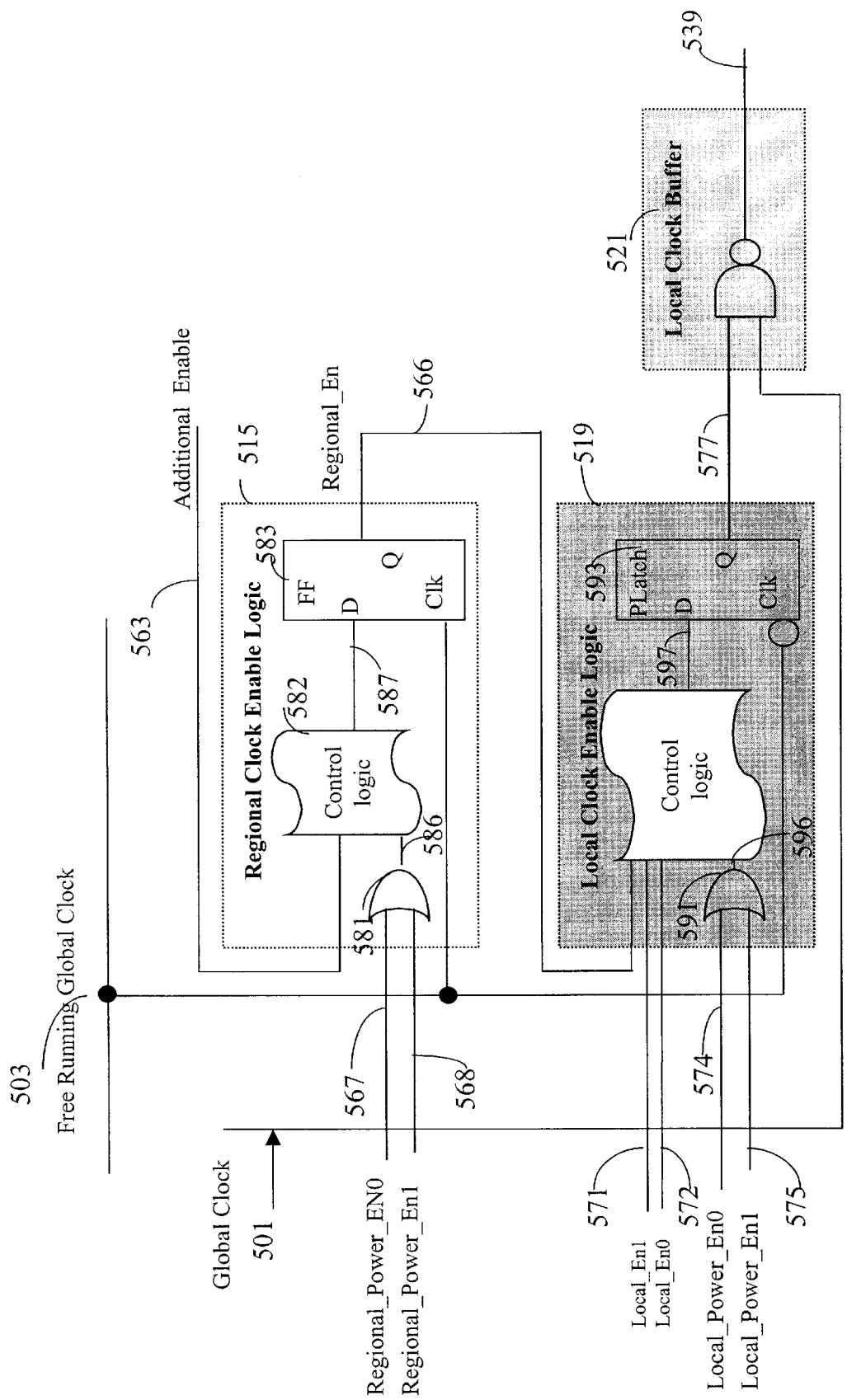
FIG. 5 illustrates an exemplary low-level clock gating control circuit in accordance with embodiments of the present invention.

FIG. 5 illustrates an exemplary low-level clock gating control (logic) circuit in accordance with embodiments of the present invention such as low-level clock gating control circuit 410 in FIG. 4. Gating control circuit 410 (FIG. 4) produces a gated clock output for local logic circuit 420 from the clock signal input (from clock source 405), and inputs from high-level gating logic circuit 415 and local clock-gating conditions 435. The low-level gating control circuit 410 may include a regional clock enable (RCE) logic circuit 515 (FIG. 5), local clock enable (LCE) logic circuit 519, and local clock (gating control) buffer (LCB) circuit 521. Regional enable logic circuit 515 includes logic circuit 581, control logic 582, and flip-flop 583. Local enable logic circuit 519 includes logic circuit 591, control logic 592, and latch circuit 593. Local clock-buffer 521, similar to local gating circuit 300 in FIG. 3, includes logic circuit 523 (e.g., AND, inverter logic circuits).

In an embodiment, a free-running global clock signal 503, generated from clock source 405, may be input to RCE circuit 515. From global clock signal input 503, inputs 567, 568 (regional_power_en0, regional_power_en1), and an optional additional enable signal input 563 (e.g., test mode enable signal), RCE circuit 515 outputs a regional clock enable signal 566 that may be used to drive a plurality of LCE circuits. Inputs 567, 568, 563 may be generated from high-level gating logic circuit 415, resulting from particular global gating and interface-gating conditions being met.

Particularly, inputs 567, 568 may be a 2-bit mutually exclusive (always having opposing logic levels) trigger to activate low-level (e.g., regional, local) clock gating where inputs 567, 568 are selectively given priority over another. For example, input 567 may be enabled (carrying a "1" logic level) to trigger low-level clock gating during regular functional operation (e.g., power/reset operation) of the processor system while input 568 remains disabled (carrying a "0" logic level). Alternatively, input 568 may be enabled to trigger low-level clock gating during a testing mode of the processor system while input 567 remains disabled. Since inputs 567, 568 are received by logical OR gate 581, the input that is currently given priority (enabled) will continually trigger low-level clock gating using control logic 582.

As illustrated in FIG. 5, the output signal 586 from OR gate 581 (resulting from inputs 567, 568) is input to control logic 582 along with the optional additional enable signal 563 to generate output signal 587. Output signal 587, along with free-running global clock signal 503, is fed into flip-flop 583 to generate regional clock enable signal 566.

The regional clock enable signal 566 may be input to LCE circuit 519. From the regional clock enable signal 566, two pairs of mutually exclusive inputs 571, 572 (local_en1, local_en0) and 574, 575 (local_power_en0, local_power_en1), LCE circuit 519 outputs a local clock gating enable signal 577. Inputs 571, 572, 575, 574 may be generated from local gating condition 435 as illustrated in FIG. 4. Local clock enable signal 577 may be used to drive a plurality of LCB circuits such as LCB circuit 521. Similar to mutually exclusive inputs 567, 568, one portion of the two pairs of inputs 571, 572 and 574, 575, may be individually given priority (enabled) to enable local clock gating during a functional operation or a testing mode of the processor system. Inputs 571, 572 may be used to enable local clock gating during different types (e.g., normal, advanced, etc.) of functional operation.

As illustrated in FIG. 5, the output signal 596 from OR gate 591 (resulting from inputs 574, 575) is input to control logic 592 along with input signals 571, 572 and regional clock enable signal 566 to generate output signal 597. Output signal 597, along with free-running global clock signal 503, may be input to latch circuit 593 to generate local clock enable signal 566. Latch circuit 593 may be a transparent latch circuit that lets the input signal (e.g., output signal 597) quickly pass through without delay to meet predetermined timing constraints within the processor system.

Similar to the functionality illustrated in FIG. 3, local clock enable signal 566 and a global clock signal 501 (generated from clock source 405) may be fed into logic circuit (e.g., NAND gate) 579 to produce gated (local) clock output signal 539 for local logic circuit 420. A similar operation may occur for each interconnected RCE/LCE circuit for clock gating control circuitry. Advantageously, in accordance with embodiments of the present invention, the global clock signal 501 may be a predetermined, delayed version of the free-running clock signal 503 to reduce any negative effects (and meet timing constraints) resulting from clock skew (caused by glitches) and shortened setup time.

Of course, in accordance with embodiments of the present invention, control logic 582, 592 may be designed to fit particular clock gating conditions and timing conditions defined by an implementation for which the present embodiments may be used. Control logic 582, 592 may be implemented as combination logic circuits (e.g., AND, OR, etc.) selected to satisfy particular clock gating parameters including, but not limited to, load capacitance, distance, timing, skew rate, noise, testing/debugging constraints, and physical design constraints. Additionally, LCB circuit 521 may include further control logic to meet these parameters. Furthermore, the gated clock output signal 539 may include a small period of a digital high signal that provides effective reduction of power consumption within an integrated circuit (e.g., processor system) while still maintaining necessary processor functions to be performed.

In conjunction with another feature of the present invention, when a plurality of logic circuits (blocks) interface to a common logic block, there is a possibility that the common logic block cannot observe every logic block output all the time. For example, if a plurality of logic circuits interface to a multiplexer (the multiplexer being limited to selecting one logic circuit output), the multiplexer may not observe the outputs of the unselected logic circuits for every clock cycle. Therefore, in accordance with embodiments of the present invention, the clock gating control described herein may be used to generate a clock gating signal for those non-observable, unselected logic circuits (blocks).

Figure 6:
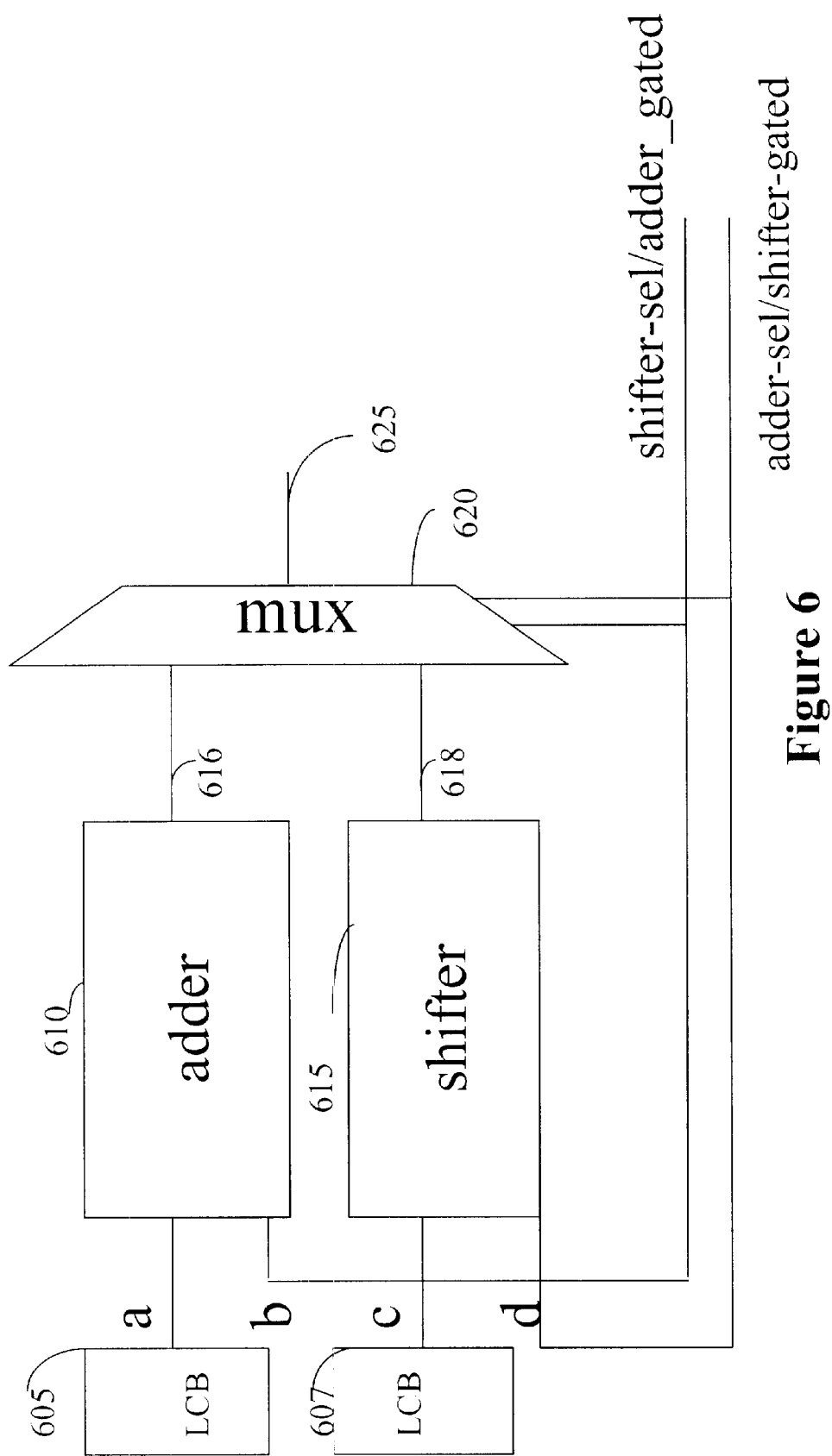
FIG. 6 illustrates an exemplary logic circuit including non-observable logic circuits that can respond to clock gating control in accordance with embodiments of the present invention.

FIG. 6 illustrates an exemplary logic circuit including non-observable logic circuits that can respond to clock gating control in accordance with embodiments of the present invention. In an embodiment, LCB circuits 605, 607 feed clock signals a, c to adder 610, and shifter 615, respectively. Also, data signals b, d are fed to adder 610, and shifter 615, respectively. Both adder 610 and shifter 615 are connected to multiplexer 620 to produce an output 625. The multiplexer 620 can only select one of the outputs 616, 618, either from the adder 610 or the shifter 615 to produce multiplexer output 625. Due to this output limitation, when the multiplexer 620 selects the adder output 616, then the shifter 615 may be clock gated. Since the output 618, from shifter 615, cannot be observed by the interfaced common logic circuit (multiplexer 620) when output 616, from adder 610, is selected, it does not matter whether shifter 615 is running (operating at normal clock frequency) or is clock gated. Alternatively, if the multiplexer 620 selects the shifter output 618, then the adder 610 may be clock gated. Advantageously, for efficient timing, the adder 610 and shifter 615 operate on one clock cycle or on the same time interval for the multiplexer 620 to select an output.

Also, in accordance with the clock gating process as shown in FIG. 5, clock gating can simultaneously either enable or disable several logic blocks in an integrated circuit in a single clock cycle, which can cause a significant change in the current supply of the integrated circuit. This can cause voltage changes throughout the integrated circuit and cause logic circuits to malfunction. To solve this problem, one or more monitoring circuits 432 may be added to the clock gating control logic of FIG. 4 that are interconnected to low-level gating logic 410. The monitoring circuit determines an expected rate of current change (di/dt) and compares it to a predetermined threshold rate when a clock gating signal is generated from low-level gating logic circuit 410, and adjusts the clock gating sequence and/or priority when the threshold is exceeded to reduce the rate of current change.

In an exemplary embodiment, the monitoring circuit 432 may include one or more control logic circuits and registers that count the number of LCEs (and interconnected LCBs) that will be enabled to trigger clock gating. The monitoring circuit 432 may be directly connected, via control logic circuits including registers, to the low-level gating logic circuitry 410 to observe input signals from local gating condition 435. The monitoring circuit may have a predetermined count of the number of LCEs, and associated interconnected LCBs, in the low-level gating logic circuitry 410. The monitoring circuit, at least one clock cycle in advance, directly observes the local gating condition signal 435 that is input to low-level gating logic 410 to determine which and how many LCEs will be enabled for clock gating during the next clock cycle. The use of registers to count and store information regarding particular dynamic circuit characteristics is well-understood in the field of invention. For example, if every LCE connects to sixteen LCBs, then enabling three LCEs (for clock gating on the next clock cycle) will turn on 48 LCBs resulting in a severe current drain on the power supply which may lead to over-heating. To combat this severe current drain, the monitoring circuit may intervene to completely disable clock gating for the next clock cycle by disabling the LCE(s) scheduled to initiate clock gating. Alternatively, the monitoring circuit may activate clock gating gradually by enabling each LCE sequentially (and separately) over a plurality of succeeding clock cycles to reduce the current drain.

Furthermore, the monitoring circuit may ensure that all logic blocks do not enable and disable simultaneously, but rather only a maximum, limited number of logic blocks may be enabled and disabled simultaneously so as not to exceed a current supply limitation. Alternatively, or in combination, the global clock gating condition 425 may automatically prioritize the clock gating enabling or disabling sequence to avoid maximal di/dt swing. Also, this monitoring scheme may apply to a reset sequence to ensure that clock gating is sequentially engaged to reduce the di/dt problem and possibly overheat the (silicon) integrated circuit. Use of the monitoring scheme allows the clock distribution and gating control system described herein to efficiently control active power by monitoring the sudden current variation (di/dt) demand to ensure proper integrated circuit functionality with reduced active power, and thereby reduce the risk of integrated circuit malfunctions when reducing active power by clock gating.

Embodiments of the present invention provide many advantages. Advantageously, in accordance with embodiments of the present invention, each clock gating logic circuit may be enabled or disabled independently and individually. A design for testing (DFT) or a design for debugging (DFD) implementation may have this feature. The clock gating architecture combined with the high-level clock gating logic circuitry described herein provides efficient partitioning of clock gating logic circuitry in fine granularity to maximally utilize all possible clock gating conditions. Instead of disabling all low-level clock gating functionality, embodiments of the present invention may selectively disable the low-level clock gating logic circuitry to ensure efficient integrated circuit functionality and performance.

Furthermore, generation of the gated clock signal provides a number of benefits including, but not limited to, satisfying timing requirements for a shortened clock cycle period, preventing potential current supply shortages caused by massive clock gating, and securing active power reduction by overcoming local level clock gating and local circuitry interaction (timing) failures with fine granularity of enable/disable control.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. A clock distribution apparatus, comprising:
   a clock source;
   a plurality of local logic circuits;
   a clock distribution network interconnecting the clock source to each of the local logic circuits, the network including a plurality of clock gating control circuits; and
   a clock gating control circuit provided in a propagation path between the clock source and each of the local logic circuits, wherein the control system is to respond to a clock gating condition to initiate a clock gating enabling signal for at least one clock gating control circuit.

2. The apparatus of claim 1, wherein said clock gating condition includes a combination of global, interface, and local clock gating conditions.

3. The apparatus of claim 1, wherein the clock distribution network is provided within an integrated circuit.

4. The apparatus of claim 1, wherein the clock distribution network extends across multiple integrated circuits.

5. A clock distribution apparatus, comprising:
   a clock source;
   a plurality of local logic circuits;
   a clock distribution network interconnecting the clock source to each of the local logic circuits, the network including a plurality of clock gating control circuits; and
   a clock gating control circuit provided in a propagation path between the clock source and each of the local logic circuits,
   wherein the control system is to respond to a clock gating condition to initiate a clock gating enabling signal for at least one clock gating control circuit, and
   wherein said clock gating condition includes a combination of global, interface, and local clock gating conditions.

6. An apparatus to control power consumption for an integrated circuit, comprising:
   a clock distribution network to generate at least one clock signal for an integrated circuit; and
   a multiple level clock gating control circuit including at least a high-level clock gating control circuit and a low-level clock gating control circuit to generate, without redundant input of enabling signals for clock gating, a gated clock signal from the clock signal, and distribute the gated clock signal to one of a plurality of local logic circuits.

7. The apparatus of claim 6, wherein the low-level clock gating control circuit includes at least one local clock gating control circuit to generate the gated clock signal for the one of the plurality of local logic circuits.

8. The apparatus of claim 6, wherein the low-level clock gating control circuit includes a regional clock enable logic circuit, and at least one local clock enabling logic circuit, the regional clock enable logic circuit to generate a low-level clock enabling signal for the at least one local clock enabling logic circuit, and the local clock enabling circuit to generate a local clock enabling signal for the local clock gating control circuit.

9. The apparatus of claim 6, wherein the clock gating control logic circuit includes a monitor logic circuit that compares an expected rate of current change with a predetermined threshold when an enabling signal for clock gating is generated, and adjusts the sequence and priority for the clock gating signal generation when the threshold is exceeded to reduce the rate of current change below the threshold.

10. The apparatus of claim 6, wherein the multiple level clock gating control circuit includes an interface clock gating logic circuit to generate a clock gating disabling signal to reduce failures between interacting local logic circuits.

11. The apparatus of claim 6, wherein the local logic circuit includes a plurality of logic circuits connected to a common logic circuit and the multiple level clock gating control circuit generates a gated clock signal for one of the plurality of logic circuits when the output of that one logic circuit is not observable by the common logic circuit.

12. The apparatus of claim 6, wherein the clock signal frequency is at least 2 giga-hertz.

13. The apparatus of claim 6, wherein the gated clock signal is generated in response to at least a local clock gating condition being satisfied.

14. The apparatus of claim 6, wherein the gated clock signal is generated in response to a clock gating condition being satisfied where the clock gating condition includes a combination of global, interface, and local clock gating conditions.

15. The apparatus of claim 6, wherein the low-level clock gating control circuit is closely located to the one local logic circuit to setup the generation and distribution of the gated clock signal during the duty cycle of the clock signal.

16. A system to control power consumption of an integrated circuit, comprising:
a clock source to generate a clock signal;
a clock distribution network to distribute the clock signal to a plurality of local logic circuits of a processor;
a multiple level clock gating control circuit including at least a low-level clock gating control circuit to generate, without redundant input of enabling signals for clock gating, a gated clock signal from the clock signal, and distribute the gated clock signal to one of a plurality of local logic circuits.

17. The system of claim 16, wherein the low-level clock gating control circuit is closely located to the one local logic circuit to setup the generation and distribution of the gated clock signal during the duty cycle of the clock signal.

18. The system of claim 16, wherein the clock frequency of the clock signal is at least 2 giga-hertz.

19. The system of claim 16, wherein the gated clock signal is generated in response to a local clock gating condition being satisfied.

20. A method to control power consumption of a processing system, comprising:
generating a clock signal;
distributing the clock signal to a plurality of local logic circuits of a processor using a clock distribution network; and
generating, without redundant input of enabling signals for clock gating, a gated clock signal from the clock signal, and distributing the gated clock signal to one of the plurality of local logic circuits using a multiple level clock gating control circuit including at least a high-level clock gating control circuit and a low-level clock gating control circuit.

21. The method of claim 20, further comprising:
comparing an expected rate of current change with a predetermined threshold when an enabling signal for clock gating signal is generated; and
adjusting the sequence and priority for the clock gating signal generation when the threshold is exceeded to reduce the rate of current change below the threshold.

22. The method claim 20, wherein generating the gated clock signal includes generating the gated clock signal in response to a local clock gating condition being satisfied.

23. The method of claim 20, wherein generating the gated clock signal includes generating the gated clock signal in response to a clock gating condition being satisfied where the clock gating condition includes a combination of global, local, and interface clock gating conditions.

* * * * *